(12) United States Patent
Ishigami et al.

(10) Patent No.: US 8,295,641 B2
(45) Date of Patent: Oct. 23, 2012

(54) IMAGE PROCESSING APPARATUS, IMAGE PROCESSING METHOD, AND MEDIUM STORING IMAGE PROCESSING PROGRAM

(75) Inventors: Miho Ishigami, Tokyo (JP); Ichiro Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 12/545,348

(22) Filed: Aug. 21, 2009

(65) Prior Publication Data
US 2010/0074546 A1    Mar. 25, 2010

(30) Foreign Application Priority Data

Sep. 19, 2008  (JP) ................. 2008-241690

(51) Int. Cl.
*G06K 9/64* (2006.01)
(52) U.S. Cl. ........ 382/278; 382/251; 382/282; 250/204; 348/225.1; 348/261
(58) Field of Classification Search .............. 382/252, 382/278, 282; 250/204; 348/225.1, 261
See application file for complete search history.

(56) References Cited

U.S. PATENT DOCUMENTS

| | | | |
|---|---|---|---|
| 6,570,612 B1 | 5/2003 | Saund | |
| 7,177,483 B2 | 2/2007 | Saund | |
| 2004/0012700 A1 | 1/2004 | Okisu | |
| 2006/0045386 A1 | 3/2006 | Fukuoka et al. | |
| 2007/0025617 A1 | 2/2007 | Dai et al. | |
| 2007/0047835 A1* | 3/2007 | Kondo | 382/275 |
| 2007/0201758 A1 | 8/2007 | Kuno | |
| 2008/0056616 A1* | 3/2008 | Hasegawa | 382/298 |

FOREIGN PATENT DOCUMENTS

| | | |
|---|---|---|
| JP | 2004-265384 | 9/2004 |
| JP | 2006-162692 | 6/2006 |
| JP | 2006-344069 | 12/2006 |
| JP | 2007-233433 | 9/2007 |

OTHER PUBLICATIONS

Tao et al.; "An Illuminance-Reflectance Nonlinear Video Enhancement Model for Homeland Security Applications"; Applied Imagery and Pattern Recognition Workshop Proceedings, Dec. 2005.*

* cited by examiner

*Primary Examiner* — Jingge Wu
*Assistant Examiner* — Eueng-Nan Yeh
(74) *Attorney, Agent, or Firm* — Fitzpatrick, Cella, Harper & Scinto

(57) ABSTRACT

A reflectance image that represents a reflectance distribution, and an illuminance component image that represents an illuminance distribution are generated from an input image. A plurality of small regions, which are divided based on illuminance components of the generated illuminance component image, are specified. A quantized image is generated from the reflectance image for respective specified small regions. Regions having equal quantized pixel values are acquired in the quantized image. Representative pixel values for the respective acquired regions are acquired based on the illuminance component image. Quantized pixel values of the respective acquired regions are corrected using the acquired representative pixel values.

8 Claims, 13 Drawing Sheets

IMAGE PROCESSING APPARATUS, IMAGE PROCESSING METHOD, AND MEDIUM STORING IMAGE PROCESSING PROGRAM

BACKGROUND OF THE INVENTION

1. Field of the Invention

The present invention relates to an image processing apparatus for quantizing an image, an image processing method, and a medium storing an image processing program.

2. Description of the Related Art

In recent years, along with the advance of digitization of information, systems that scan paper documents using a scanner or the like to convert them into digital document images and save the digital document images instead of saving the paper documents intact, and transmit such digital document image data to other apparatuses, have prevailed. In such systems, in order to reduce transmission cost at the time of transmission, high compressibility is often required for digital documents. Also, reusability that allows partial editing of digital data, and high image quality that can assure high image quality even after enlargement or reduction are required. However, when a document image includes both a text region and photo region, if compression suited to a text region is applied, high image quality is assured but the compression ratio is low. On the other hand, if compression suited to a photo region is applied, a high compression ratio is assured but character legibility deteriorates. Hence, it is difficult to simultaneously meet both high image quality and high compressibility requirements.

However, in recent years, a technique has been proposed which separates a digital document image into text and photo regions, converts, into vector data, the text region for which the reusability and high image quality are to be emphasized, compresses the photo region or the like which cannot be easily reproduced by vector conversion, and composites and outputs the compression results of the respective regions. Also proposed is a technique for converting, into vector data, a specific image (an illustration and characters) which is included in an image that is compressed so far as a photo, and has features (e.g., such specific image is clear like an edge of an object, and has a limited number of colors). In recent years, these techniques have allowed the realization of high compressibility, high image quality, and reusability for document images.

In such situations, a vector conversion processing target is not limited to the aforementioned scan image of the paper document. For example, after an image on a paper document, whiteboard, or the like is captured using a digital camera, the image is then transmitted to a server or the like, which applies automatic corrections of a distortion and luminosity level to the image. Then, the corrected image is converted into a PDF image or vector data, which is easy to view, and the PDF image or vector data is saved.

In particular, characters and figures written on a whiteboard have features of the aforementioned specific image (an illustration and characters), that is, the number of colors of pens for the whiteboard is limited, and the boundaries (edges) between a background and brushstrokes are clear. Therefore, a captured image of the whiteboard is well-suited for conversion into vector data. Hence, an input image of a digital camera is separated into regions for respective colors based on color features, and edge lines of respective color regions are converted into vector data, so as to realize the high compressibility, high image quality, and reusability of the input image of the digital camera.

However, since illumination nonuniformity readily occurs due to, for example, light from a camera flash used at capture time using a digital camera, an illustration portion and a background portion having similar colors are extracted as one region upon extraction of regions for respective colors, and an illustration cannot be cleanly extracted. Especially when an input image is a grayscale image, since there are many illustration portions and background portions having similar density values, an illustration and background cannot be separated.

In order to solve this problem, for example, vector conversion processing may be executed after luminosity correction processing is fir applied to an input image of a digital camera.

On the other hand, it is common practice to correct an image using luminosity correction processing, and Japanese Patent Laid-Open No. 2007-233433 describes an image processing apparatus which can correct an illuminance level of an image using Retinex processing. However, although such luminosity correction processing can remove illumination nonuniformity to some extent, the influence of illumination nonuniformity often remains on an image with a large luminosity change. Consequently, the aforementioned problem is posed as a result of the vector conversion processing.

Figure 6:
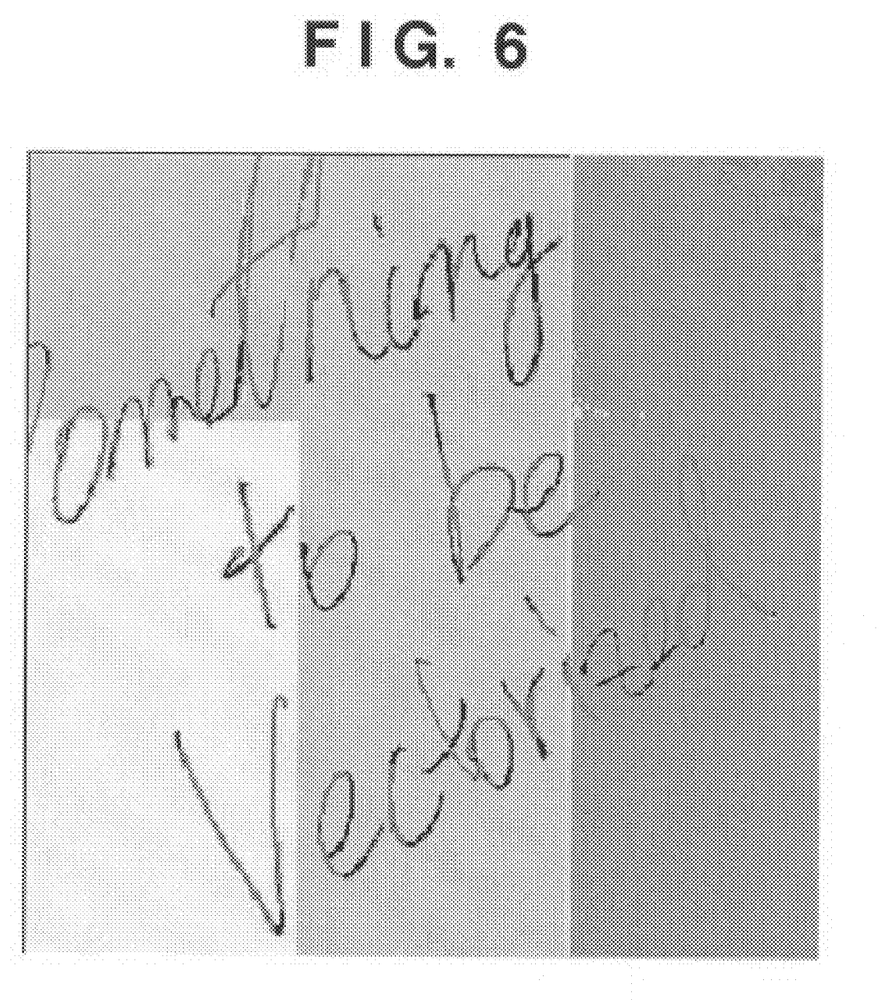
FIG. 6 is a view showing an example in which different regions have equal quantized pixel values.
Figure 7:
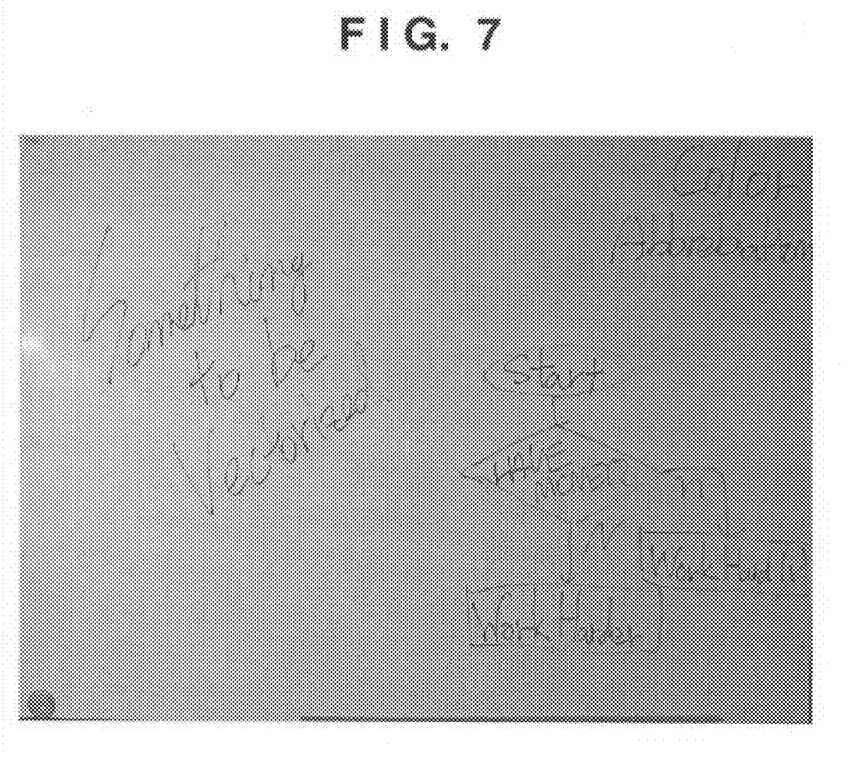
FIG. 7 is a view showing an example of an input image in the embodiment.

For example, when a flash is used upon image capture of a whiteboard using a digital camera, an image with a large luminosity change is generated. Therefore, a phenomenon whereby a white background of a dark portion (a position far from the flash) has a similar luminosity level to characters of a bright portion (a position close to the flash) may occur in neighboring regions. That is, pixels to be clustered into different clusters have undesirably similar pixel values under the influence of illumination. Therefore, when such an image is quantized and clustered (into a background and a plurality of types of foregrounds based on quantized pixel values), pixels to be clustered into different clusters are clustered into an identical cluster. For example, when multi-valued quantization is applied to pixel values on an image shown in FIG. 7, an upper right background portion has a quantized pixel value equal to an upper left blurred character portion, and they are clustered into an identical cluster. Note that FIG. 6 is a partially enlarged view of the results obtained when the image shown in FIG. 7 is divided into grid-like regions each having a predetermined size, and the respective grid-like regions are quantized.

SUMMARY OF THE INVENTION

The present invention provides an image processing apparatus, which quantizes an image with a large luminosity change without increasing a processing volume while maintaining high clustering precision, an image processing method, and an image processing program.

The present invention in its first aspect provides an image processing apparatus for quantizing an input image, comprising: a first image generation unit configured to generate, from the input image, a reflectance image that represents a reflectance distribution, and an illuminance component image that represents an illuminance distribution; a region specifying unit configured to specify a plurality of small regions divided based on illuminance components of the illuminance component image generated by the first image generation unit; a second image generation unit configured to generate a quantized image from the reflectance image generated by the first image generation unit for respective small regions specified by the region specifying unit; a region acquisition unit configured to acquire regions having equal quantized pixel values in the quantized image generated by the second image generation unit; a pixel value acquisition unit configured to acquire representative pixel values for respective regions corresponding to the regions acquired by the region acquisition unit based on the illuminance component image generated by the first image generation unit; and a correction unit configured to correct quantized pixel values of the respective regions acquired by the region acquisition unit using the representative pixel values acquired by the pixel value acquisition unit.

The present invention in its second aspect provides an image processing method executed by an image processing apparatus for quantizing an input image, the method comprising: a first image generation step of generating, from the input image, a reflectance image that represents a reflectance distribution, and an illuminance component image that represents an illuminance distribution; a region specifying step of specifying a plurality of small regions divided based on illuminance components of the illuminance component image generated in the first image generation step; a second image generation step of generating a quantized image from the reflectance image generated in the first image generation step for respective small regions specified in the region specifying step; a region acquisition step of acquiring regions having equal quantized pixel values in the quantized image generated in the second image generation step; a pixel value acquisition step of acquiring representative pixel values for respective regions corresponding to the regions acquired in the region acquisition step based on the illuminance component image generated in the first image generation step; and a correction step of correcting quantized pixel values of the respective regions acquired in the region acquisition step using the representative pixel values acquired in the pixel value acquisition step.

The present invention in its third aspect provides a computer-readable medium storing an image processing program for quantizing an input image, the program making a computer function to: generate, from the input image, a reflectance image that represents a reflectance distribution, and an illuminance component image that represents an illuminance distribution; specify a plurality of small regions divided based on illuminance components of the generated illuminance component image; generate a quantized image from the generated reflectance image for respective specified small regions; acquire regions having equal quantized pixel values in the generated quantized image; acquire representative pixel values for respective acquired regions based on the generated illuminance component image; and correct quantized pixel values of the respective acquired regions using the acquired representative pixel values.

According to the present invention, an image with a large luminosity change can be quantized without increasing processing volume while maintaining high clustering precision.

Further features of the present invention will become apparent from the following description of exemplary embodiments with reference to the attached drawings.

DESCRIPTION OF THE EMBODIMENTS

The best mode for carrying out the present invention will be described in detail hereinafter with reference to the drawings. Note that the same reference numerals denote the same parts throughout the drawings, and a description thereof will not be repeated.

Figure 1:
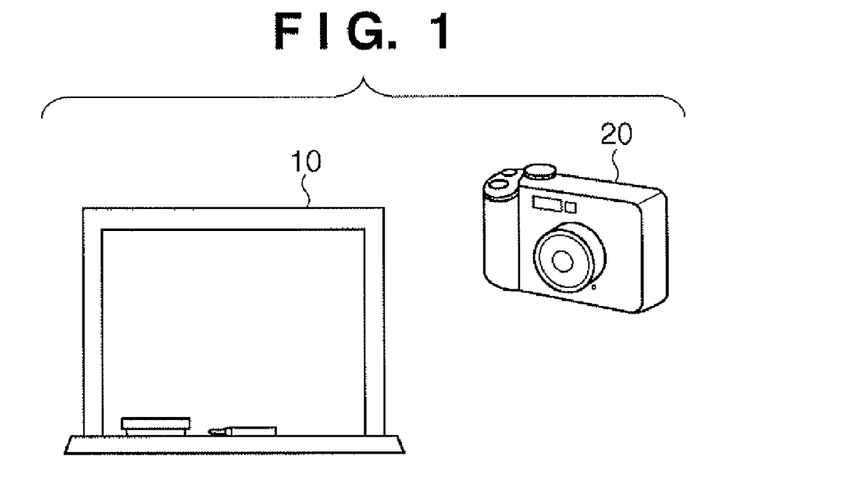
FIG. 1 is a view showing a whiteboard and a digital camera, which are used to capture an input image in an embodiment of the present invention.

FIG. 1 is a view showing a whiteboard 10 and a digital camera 20 used to capture an image in this embodiment. FIG. 7 is a view showing an image captured by the digital camera 20 using flashlight after characters are handwritten on the whiteboard 10 in FIG. 1. In this embodiment, the captured image shown in FIG. 7 is used as an input image, and a text region handwritten on the whiteboard is extracted and converted into vector data. In this case, illumination nonuniformity caused by the flash of the digital camera 20 is corrected, and quantization is then executed. When an image of the whiteboard is captured from an oblique direction, a trapezoidal (or quadrate) distortion occurs. Hence, it is desirable to perform distortion correction before the processing (illumination nonuniformity correction, vector conversion, and the like; to be described later) of the present invention. As a method of correcting such distortion, for example, a method of detecting the four sides of the whiteboard by detecting linear positions with a large luminosity difference, and correcting these four sides to form a rectangle may be used.

In this embodiment, the whiteboard will be exemplified as an object. However, the type of object is not limited to the whiteboard. For example, an object which has a surface whose reflectance is constant to some extent may be used, and white paper may be used. Also, since a screen—a projector screen, for example—onto which an image is projected can be assumed to have a nearly constant reflectance, the present invention can be applied to such a screen.

In the image shown in FIG. 7, an example of illumination nonuniformity caused when the whiteboard is illuminated with light from a flash from one illumination source is illustrated. However, the number of illumination sources is not limited to one. For example, the present invention can be applied to illumination nonuniformity caused by a plurality of illumination sources.

Figure 16:
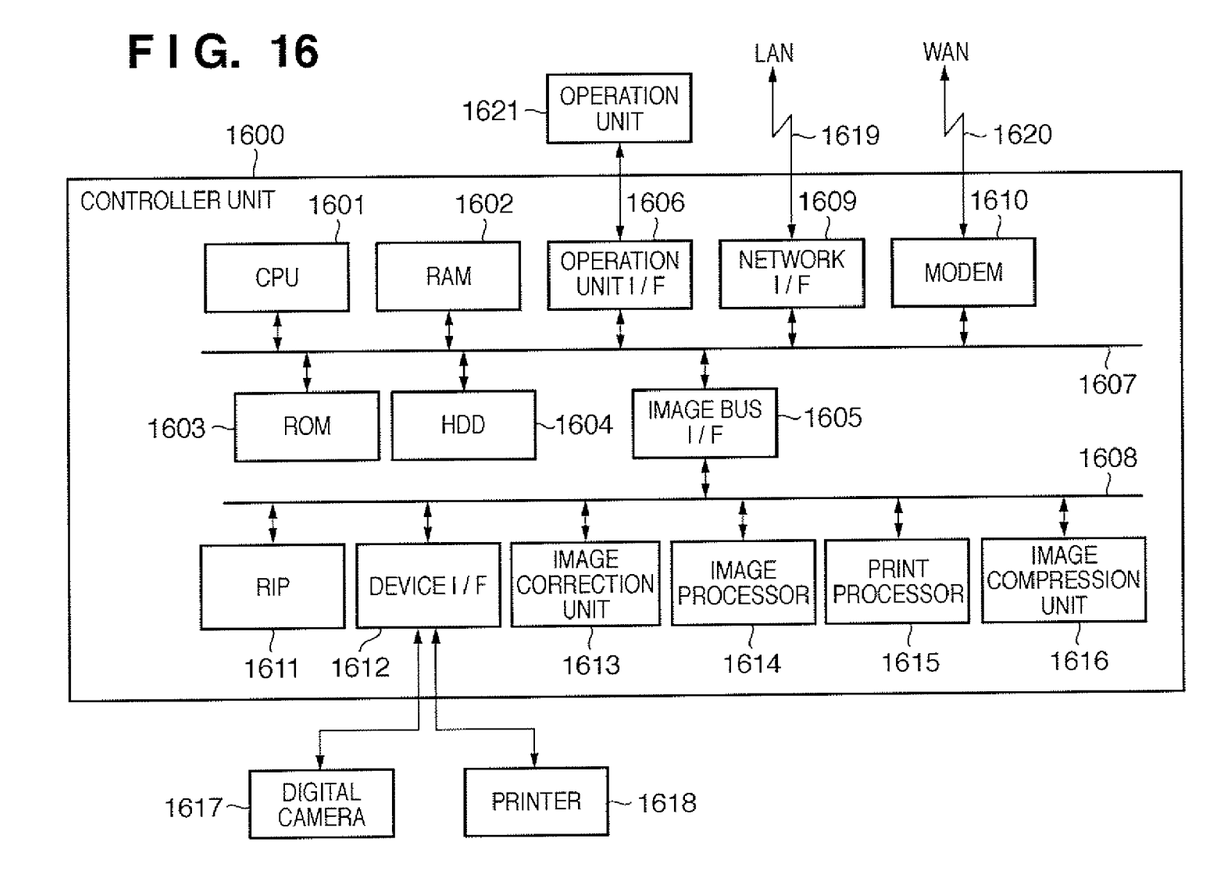
FIG. 16 is a block diagram showing an example of the arrangement of an image processing apparatus.

FIG. 16 is a block diagram showing the arrangement of principal part of a digital multi-function peripheral equipment (MFP) to which the present invention is applicable. Note that in this embodiment, the digital MFP having a scanner function and printer function is used as an image processing apparatus. Alternatively, a system which connects a general-purpose scanner and personal computer may be used as an image processing apparatus.

As shown in FIG. 16, the MFP includes a controller unit 1600 which serves as an image processing apparatus. The controller unit 1600 connects a digital camera 1617 as an image input device, and a printer 1618 as an image output device. The controller unit 1600 executes control to implement a copy function that executes control of the printer 1618 to print out image data read from a document image by the digital camera 1617. The controller unit 1600 also executes control to exchange pattern images, device information, and the like with other apparatuses via a LAN 1619 or public network (WAN) 1620.

As shown in FIG. 16, the controller unit 1600 has a CPU 1601 which controls respective blocks to be described below. The CPU 1601 launches an operating system (OS) by a boot program stored in a ROM 1603. Then, the CPU 1601 implements various kinds of processing by executing application programs stored in an HDD (hard disk drive) 1604 on this OS. A RAM 1602 is used as a work area of this CPU 1601. The RAM 1602 also provides an image memory area used to temporarily store image data in addition to the work area of the CPU 1601. The HDD 1604 stores image data together with the aforementioned application programs.

The ROM 1603 and RAM 1602 are connected to the CPU 1601 via a system bus 1607. Furthermore, an operation unit I/F (operation unit interface) 1606, network I/F (network interface) 1609, modem 1610, and image bus I/F (image bus interface) 1605 are connected to the CPU 1601. The operation unit I/F 1606 is an interface with an operation unit 1621 having a touch panel, and outputs image data to be displayed on the operation unit 1621 to the operation unit 1621. Also, the operation unit I/F 1606 outputs operation information, which is input by the user on the operation unit 1621, to the CPU 1601.

The network I/F 1609 is connected to the LAN 1619, and exchanges information with respective apparatuses connected to the LAN 1619 via the LAN 1619. The modem 1610 is connected to the WAN 1620, and exchanges information with other apparatuses via the WAN 1620. The image bus I/F 1605 is a bus bridge, which connects the system bus 1607 and an image bus 1608 that transfers image data at high speed, and converts the data structures. The image bus 1608 includes a PCI bus or "IEEE 1394". A raster image processor (RIP) 1611, device I/F 1612, image correction unit 1613, image processor 1614, print processor 1615, and image compression unit 1616 are connected via the image bus 1608.

The RIP 1611 is a processor which rasterizes PDL code data into a bitmap image. The digital camera 1617 and printer 1618 are connected to the device I/F 1612 to convert a synchronous system/asynchronous system of image data. The image correction unit 1613 applies distortion correction and luminosity correction to input image data. The image processor 1614 applies color separation processing and the like to an input image while removing illumination nonuniformity. The print processor 1615 applies printer correction, resolution conversion, and the like to image data to be printed out. The image compression unit 1616 compresses multi-valued image data to JPEG data and binary image data to data such as JBIG, MMR, or MH data, and also decompresses these data.

Figure 2:
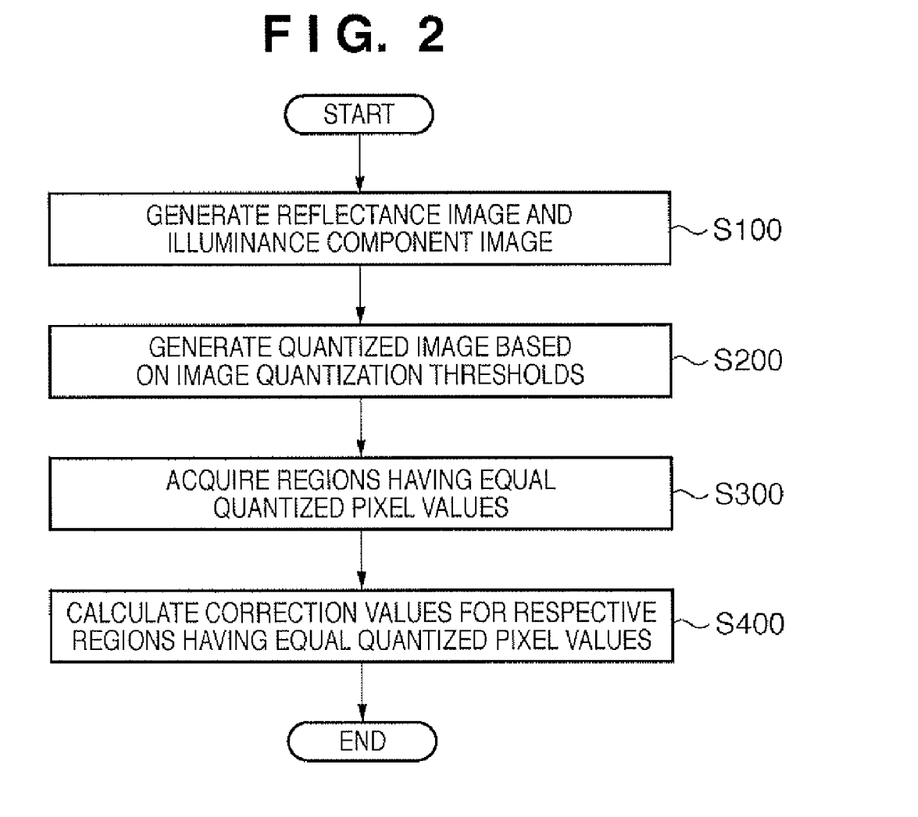
FIG. 2 is a flowchart showing the overall sequence of processing for quantizing an image that suffers illumination nonuniformity in the embodiment.
Figure 3:
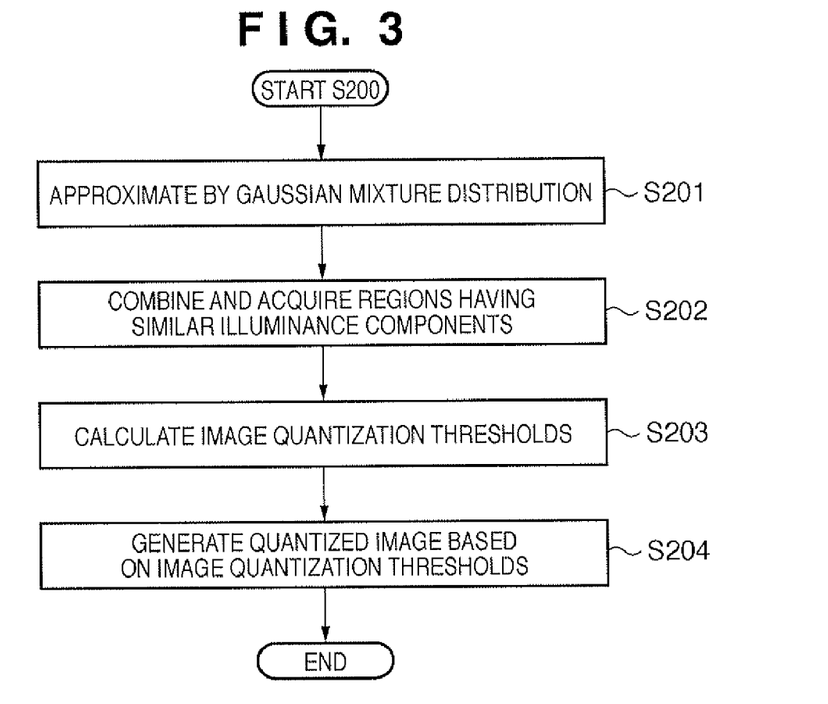
FIG. 3 is a flowchart showing the sequence of the process in step S200 shown in FIG. 2.
Figure 4:
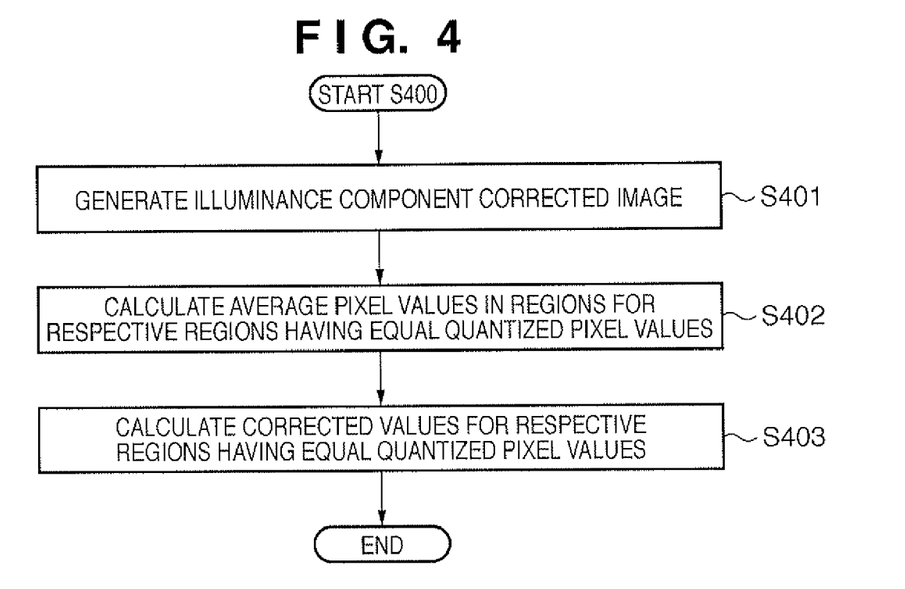
FIG. 4 is a flowchart showing the sequence of the process in step S400 shown in FIG. 2.
Figure 5:
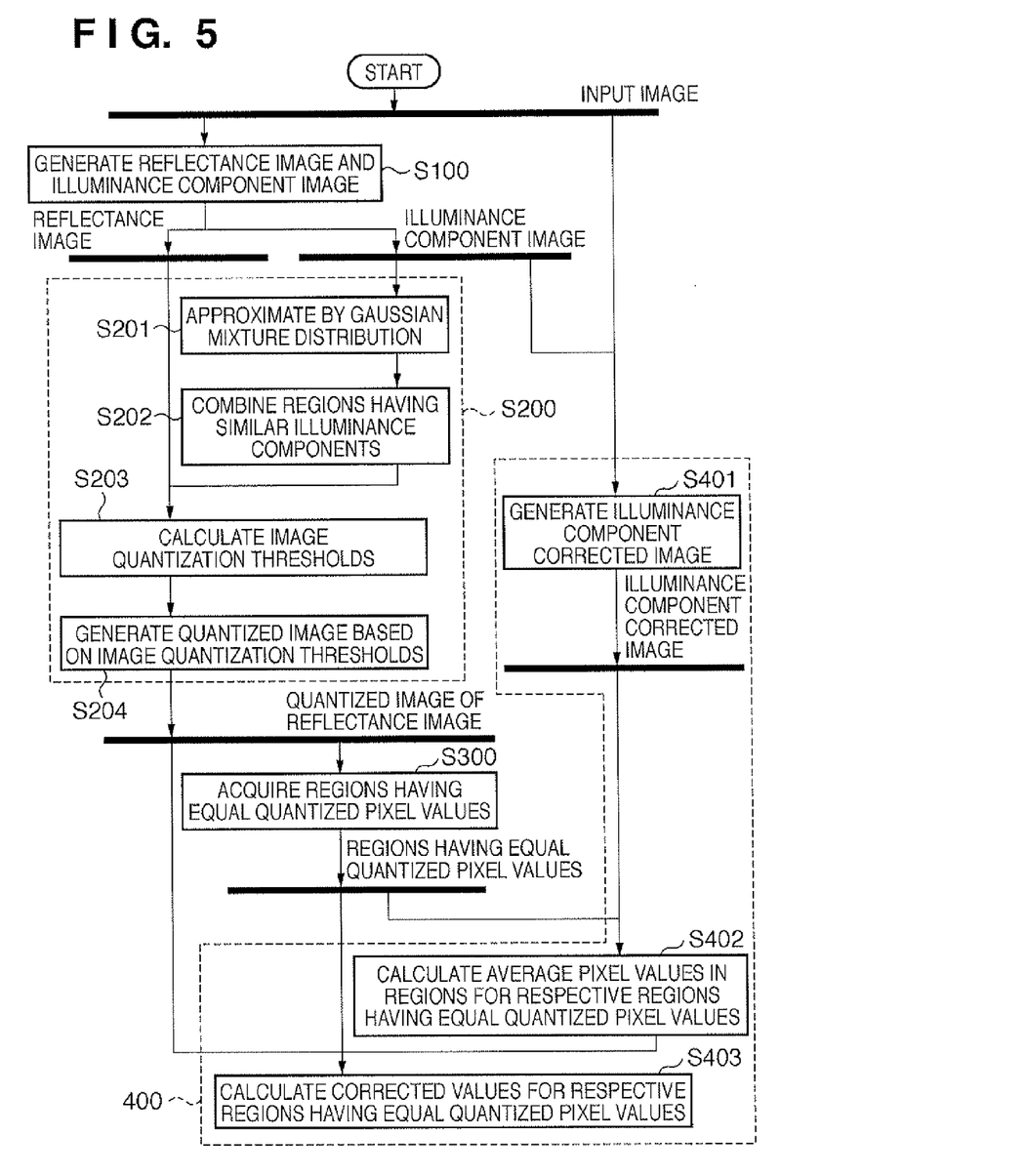
FIG. 5 is a flowchart showing the sequence of overall processing which includes the flowcharts shown in FIGS. 3 and 4 in addition to that shown in FIG. 2.

FIG. 2 is a flowchart showing the overall sequence of processing for quantizing an image that suffers illumination nonuniformity in this embodiment. FIGS. 3 and 4 are flowcharts respectively showing details of steps S200 and S400 shown in FIG. 2. FIG. 5 is a flowchart showing images to be generated by respective processes by adding the processes implemented by the flowcharts shown in FIGS. 3 and 4 to that implemented by the flowchart shown in FIG. 2. In this embodiment, an image can be generated in which illuminance components are corrected from an input image (for example, FIG. 7) that suffers illumination nonuniformity due to light from a flash (i.e., in which illumination nonuniformity is corrected), and which is quantized (for example, FIG. 14).

The flowchart shown in FIG. 2 will be described below. In the following description, the process in step S100 is executed by the image correction unit 1613 shown in FIG. 16, and the processes in steps S200 to S400 are executed by the image processor 1614.

Figure 8:
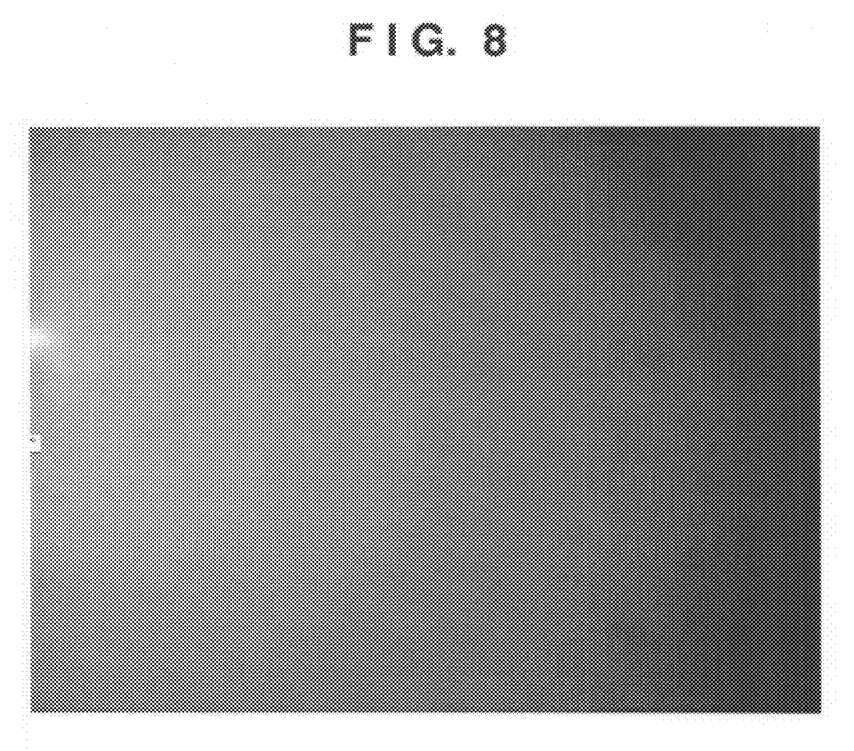
FIG. 8 is a view showing an example of an illuminance component image in the embodiment.
Figure 9:
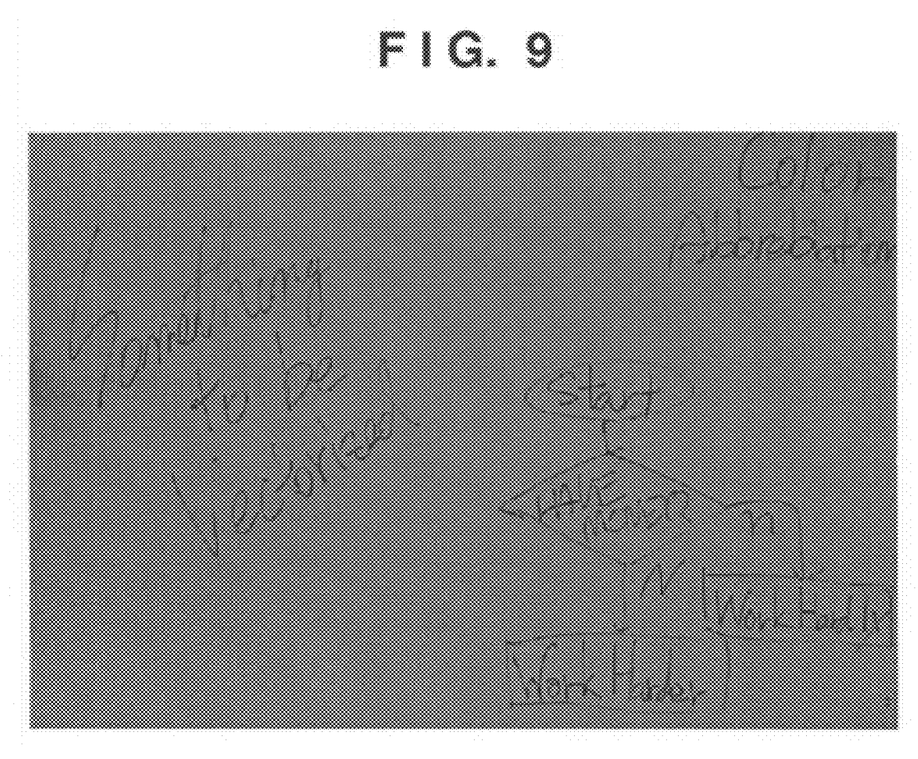
FIG. 9 is a view showing an example of a reflectance image in the embodiment.

In step S100, the image correction unit 1613 generates an illuminance component image shown in FIG. 8 and a reflectance image shown in FIG. 9 from an input image shown in FIG. 7. The illuminance component image represents the illuminance distribution of the input image, and the reflectance image represents the reflectance distribution of the input image. In processing for separating an input image into an illuminance component image and reflectance image, for example, generally known Retinex processing may be used (an example of first image generation). For example, a low-pass filter is applied to an input image to estimate an illuminance component image, and the input image is further separated into a reflectance image and illuminance component image to have a relationship (input image)=(reflectance image)×(illuminance component image).

Figure 10:
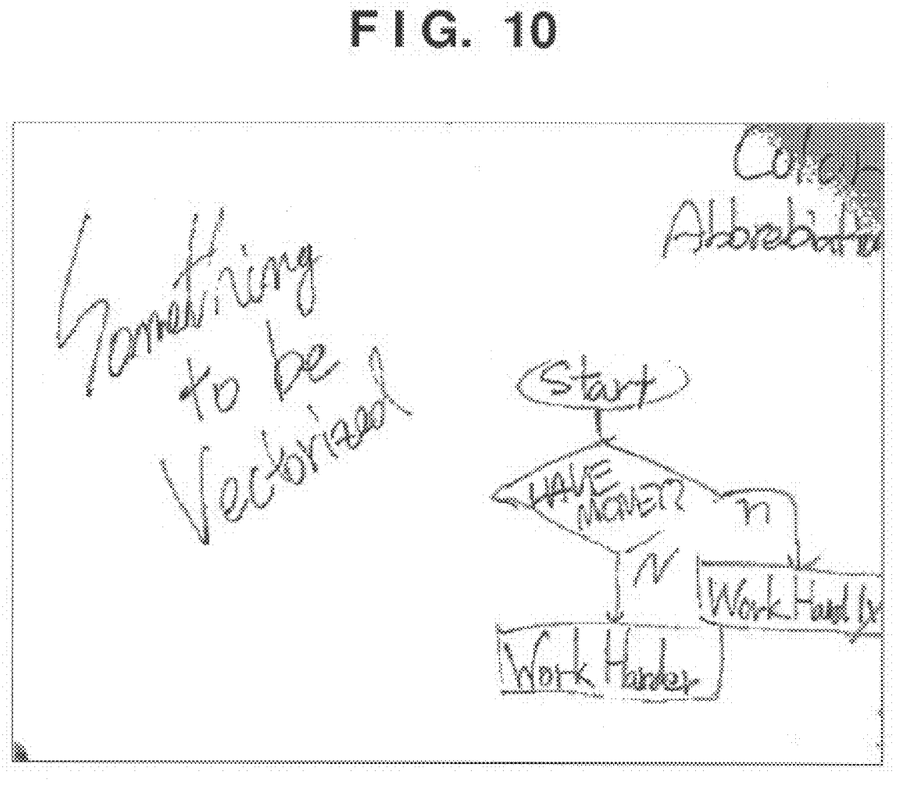
FIG. 10 is a view showing an example of a quantized image generated by executing quantization using four colors.

In step S200, the image processor 1614 divides the input image into small regions based on illuminance values of the illuminance component image generated in step S100, and quantizes the reflectance image for respective small regions, thus generating a quantized image. FIG. 10 is a view showing an example of a quantized image generated by quantizing an image (for example, 256 colors) using four colors. Assume that the image shown in FIG. 10 shows one of a plurality of small regions, and is an example obtained by quantizing this one small region (that is, an illumination is different from the example shown in FIG. 7). Details of step S200 will be described later with reference to FIG. 3.

As described above, in this embodiment, a reflectance image and illuminance component image are extracted from an input image, the input image is divided into small regions using the illuminance component image, and the reflectance image is quantized for respective small regions. Therefore, after the input image is divided into small regions each having similar illuminance values, the reflectance image is used in quantization, thus preventing pixels that should be clustered into different clusters from being clustered into an identical cluster. For example, even when a background located in a dark (low illuminance) portion has a luminosity level similar to characters located in a bright (high illuminance) portion, quantization is applied after an image is divided into small regions of the dark and bright portions. Hence, pixels in these portions can be prevented from being clustered into an identical cluster. That is, in this embodiment, precision at the time of execution of color clustering can be improved by using the reflectance image and illuminance component image.

Figure 11:
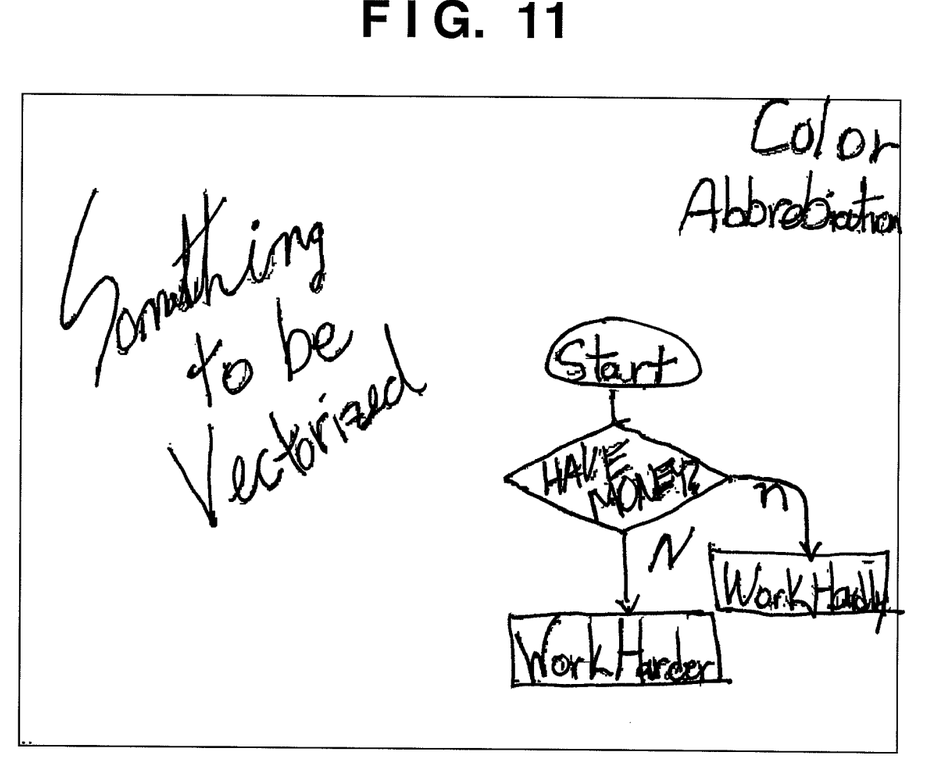
FIG. 11 is a view showing an example of regions having equal quantized pixel values in the quantized image.

In step S300, regions having equal quantized pixel values are acquired using the quantized image of the reflectance image generated in step S200 (region acquisition processing). In this embodiment, for example, when quantization is executed using four colors in the small regions divided in step S200, four images of regions having equal quantized pixel values can be extracted. FIG. 11 shows an example of an image acquired by extracting only one color of four colors from the quantized image of the reflectance image (all the four colors are described in the quantized image shown in FIG. 10). That is, FIG. 11 is a view showing one of pixel groups having equal quantized pixel values in the quantized image of the reflectance image. In this embodiment, the number of colors for quantization is not limited to four, and two or more colors may be used. Since quantization is executed for respective small regions in step S200, even pixels having an equal quantized pixel value can be acquired as different regions for respective small regions in step S300. For example, when the input image is divided into four small regions in step S200, and four regions having equal quantized pixel values are acquired in each small region in step S300, 16 (=4×4) regions are acquired from the entire input image. That is, quantization is performed in consideration of both the illuminance and reflectance levels.

In step S400, the image processor 1614 corrects the quantized pixel values in the quantized image of the reflectance image for respective regions having equal quantized pixel values acquired in step S300. In this embodiment, using the pixel values of an image obtained by correcting the input image using the illuminance component image, average pixel values are calculated for respective regions having equal quantized pixel values obtained in step S300, and the pixel values of the quantized image are replaced by these average pixel values. Details of step S400 will be explained later with reference to FIG. 4.

As described above, in this embodiment, when an input image which suffers illumination nonuniformity is quantized, a reflectance image and illuminance component image are temporarily extracted, and the reflectance image is quantized for respective small regions which are determined to have nearly equal illuminance levels, thus implementing precise clustering. Next, quantized pixel values obtained by clustering are replaced by values based on an illuminance component corrected image, which is corrected in consideration of illuminance levels. As a result, even when an image suffers illumination nonuniformity, quantization can be done without lowering the clustering precision. Furthermore, pixel values after the influence of illumination nonuniformity is removed can be assigned to respective clusters.

FIG. 3 is a flowchart showing the sequence of the process in step S200 shown in FIG. 2. In step S201, the image processor 1614 approximates the distribution of illuminance components obtained from the illuminance component image generated in step S100 by a Gaussian mixture distribution. By executing this approximation, errors encountered during illuminance component acquisition can be reduced.

In step S202, the image processor 1614 acquires small regions by combining the approximation results of the illuminance components calculated in step S201 for respective regions including similar illuminance components. Note that since the approximation processing is performed in step S201, the edges of small regions calculated in step S202 are smoothed, and another small region can be prevented from being generated in a small region due to error.

Figure 13:
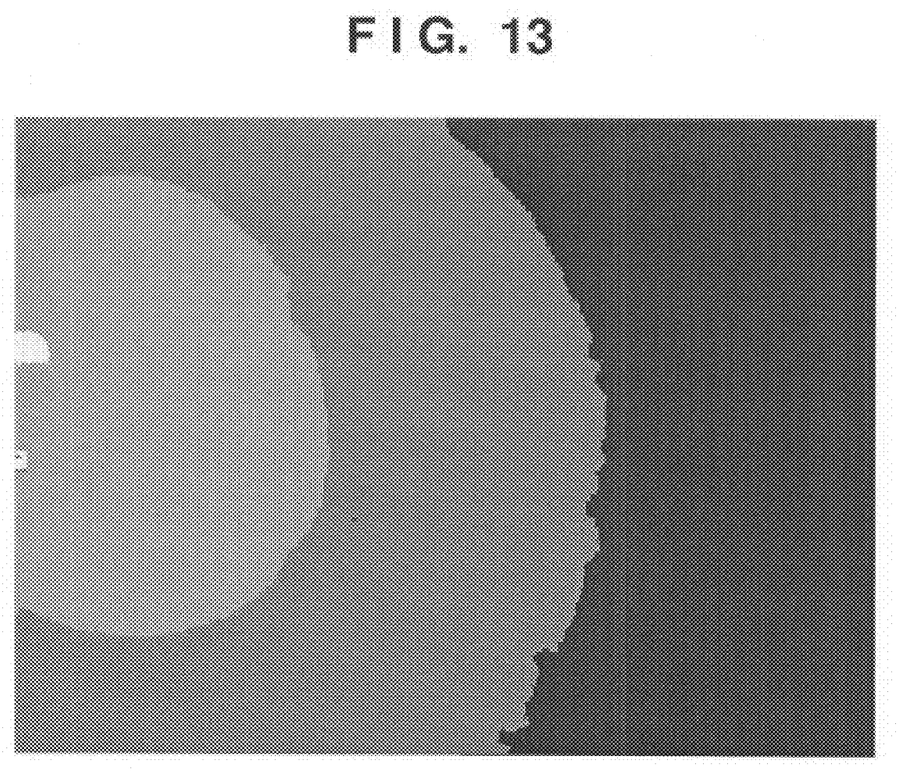
FIG. 13 is a view showing an example of combined regions in the illuminance distribution.

FIG. 13 is a view showing an example of a region group including similar illuminance components. As a method of combining regions including similar illuminance components, an arbitrary method is applied. For example, three thresholds are set in advance, and an image may be divided into a total of four regions which exist between neighboring thresholds (an example of region specification). FIG. 13 shows an example of a region group divided in this way.

In step S203, the image processor 1614 calculates image quantization thresholds used in quantization to be executed in the next step S204 based on respective pixel values of the corresponding small regions in the reflectance image for respective small regions including similar illuminance components acquired in step S202 (an example of threshold generation). For example, each small region at a corresponding position in the reflectance image is determined based on the position of that small region calculated in step S202. Then, a statistical distribution of pixel values of the reflectance image is calculated for each small region, and a quantization threshold is calculated based on the statistical distribution. For example, since a peak based on background pixel values and that based on foreground pixel values are generated in the histogram of the statistical distribution, a quantization threshold can be set in correspondence with a bottom peak between these peaks.

In step S204, the image processor 1614 quantizes the reflectance image generated in step S100 based on the image quantization thresholds calculated in step S203, thus generating a quantized image of the reflectance image (an example of second image generation).

As described above, in this embodiment, the positions of respective small regions are determined based on illuminance components, and the quantization thresholds of the reflectance image are determined for respective small regions so as to execute quantization. That is, since the quantization threshold is changed for each small region where the degree of influence of an illumination changes, an image can be appropriately quantized while eliminating the influence of an illumination.

Figure 12:
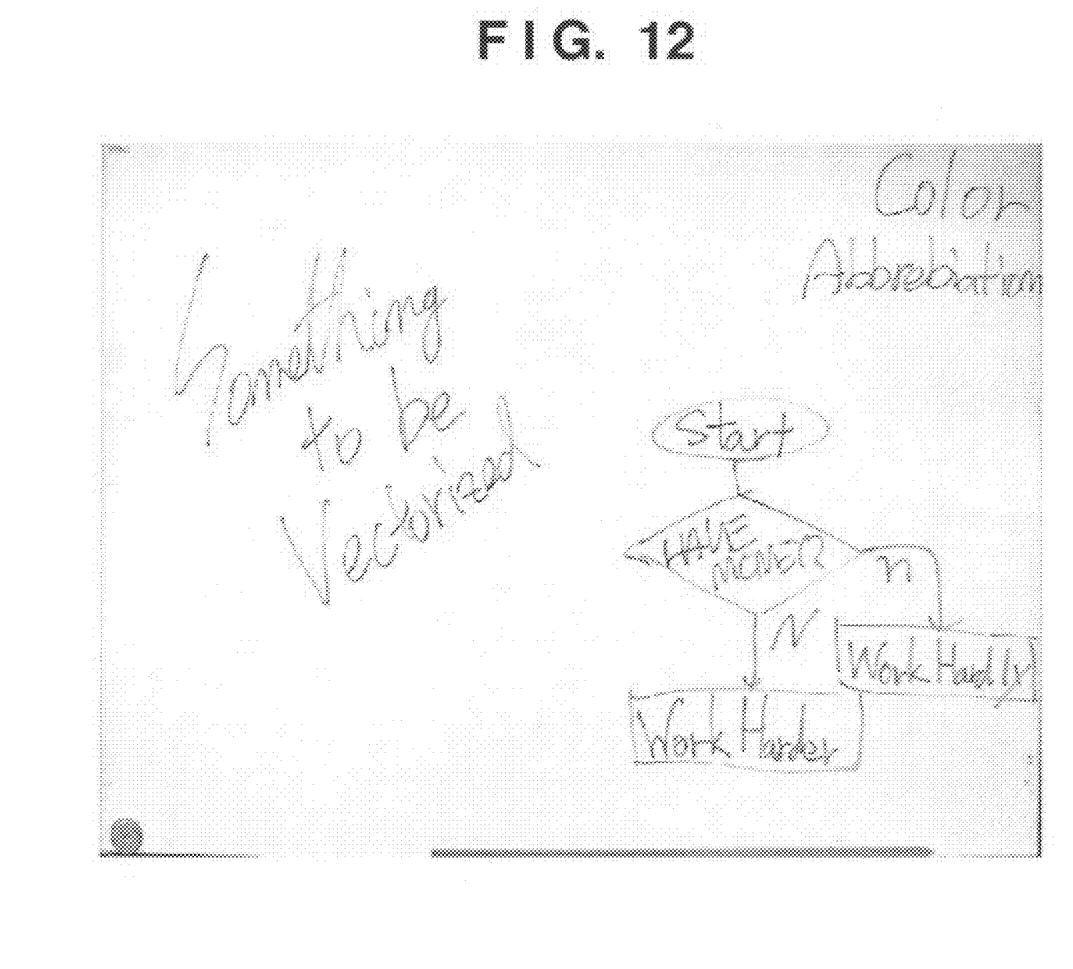
FIG. 12 is a view showing an illuminance component corrected image in the embodiment.

FIG. 4 is a flowchart showing the sequence of processing in step S400 shown in FIG. 2. In step S401, the image processor 1614 generates an illuminance component corrected image, as shown in FIG. 12, using the input image and the illuminance component image generated in step S100. The illuminance component corrected image is generated by, for example, reversing black and white pixels of the illuminance component image, and adding the reversed image to the input image (an example of third image generation). That is, when an illuminance range is between 0 and 255, the illuminance component corrected image may be calculated using an equation given by (illuminance component corrected image)=(input image)+(255−(illuminance component image)). (Note that when the value of the illuminance component corrected image exceeds 255 due to the influence of error encountered during the estimation of the illuminance component image, that value is corrected to 255.)

A method of calculating an illuminance component corrected image is not limited to this method. For example, an illuminance component corrected image may be calculated using an equation given by (illuminance component corrected image)=(input image)×(255/(illuminance component image)).

In step S402, the image processor 1614 calculates average pixel values for respective regions corresponding to those having equal quantized pixel values acquired in step S300 in the illuminance component corrected image generated in step S401 (an example of pixel value acquisition). Note that the average pixel values calculated in step S402 will also be referred to as representative pixel values hereinafter. The method of calculating an average pixel value in each region will be described later with reference to FIG. 15.

Figure 14:
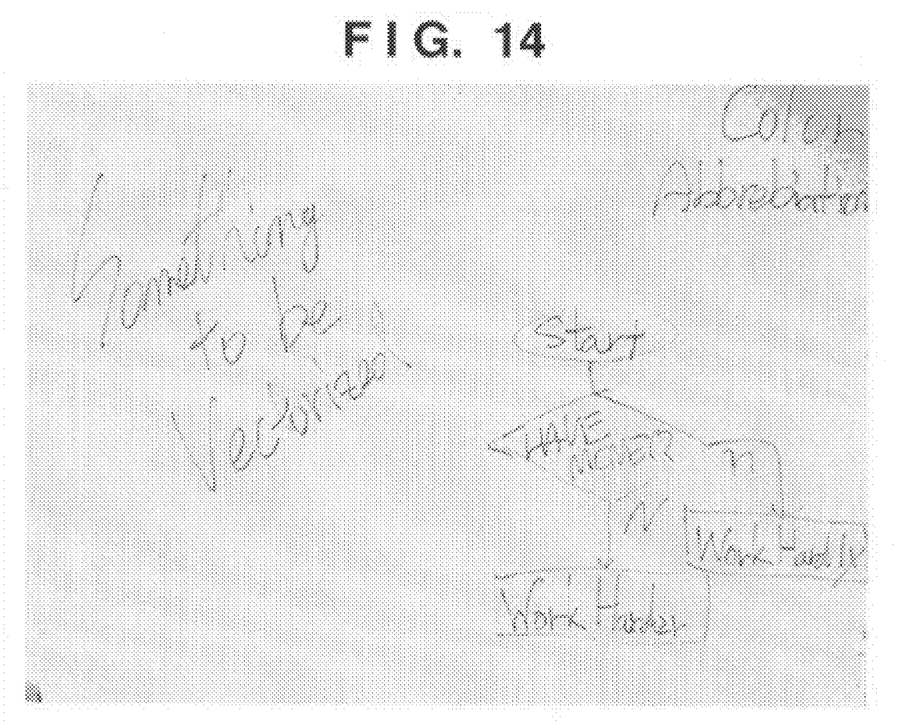
FIG. 14 is a view showing an example of a quantized image after illuminance correction.

In step S403, the image processor 1614 corrects the quantized pixel values acquired in step S300 by replacing them by the average pixel values calculated in step S402 (an example of quantized pixel value correction). FIG. 14 is a view showing an image in which illumination nonuniformity is corrected, and which is generated from the image with a large luminosity change (with illumination nonuniformity), as shown in FIG. 7, as a result of the aforementioned processing in this embodiment.

Figure 15:
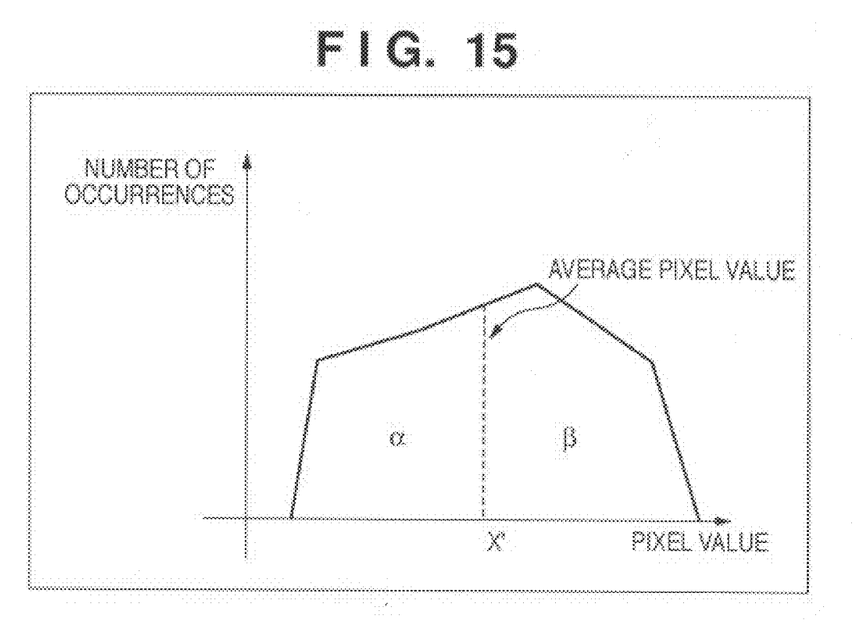
FIG. 15 is a graph showing the pixel value distribution in the illuminance component corrected image.

FIG. 15 is a graph showing a calculation example of an average pixel value for each region having an equal quantized pixel value acquired in step S300, in step S402 shown in FIG. 4. For example, assume that quantized pixel values clustered in step S300 are four colors. Let X, Y, Z, and W be regions including these equal quantized pixel values. A clustered region will also be referred to as a "class" hereinafter.

FIG. 15 shows the pixel value distribution in region X (one of the regions having equal quantized pixel values) of the illuminance component corrected image. As shown in FIG. 15, the abscissa plots pixel values, and the ordinate plots the numbers of occurrences of pixel values in region X.

Assume that, for example, "x" is given as a quantized pixel value of class X acquired in step S300. Likewise, assume that quantized pixel values "y", "z", and "w" are given to classes Y, Z, and W. That is, the quantized pixel values "x", "y", "z", and "w" are values acquired by quantization in steps S100 to S300 using the reflectance image. On the other hand, an average pixel value of each class is calculated from the pixel value distribution shown in FIG. 15. In FIG. 15, a pixel value "x'" indicated by the broken line is determined as an average pixel value. In this embodiment, the average pixel value indicated by the broken line is determined so that an area α on the left side of the broken line equals an area β on the right side of the broken line. Likewise, average pixel values "y'", "z'", and "w'" are determined for classes Y, Z, and W. Then, in step S403 the aforementioned quantized pixel values "x", "y", "z", and "w" are replaced by the calculated values "x'", "y'", "z'", and "w'".

The quantization result calculated in this way can be used to realize the high compressibility, high image quality, and reusability of a document image by, for example, extracting a handwritten text region, and converting it into vector data.

In the above description, as the method of calculating an average pixel value in step S402 shown in FIG. 4, an average of the pixel value distribution shown in FIG. 15 is calculated. In FIG. 15, the value of an average pixel value is a pixel value indicated by the broken line. In this case, the area α on the left side of the broken line equals the area β on the right side of the broken line. However, the broken line need not always be determined to guarantee that "α=β". For example, letting "k" be an arbitrary real number, an average pixel value indicated by the broken line may be calculated using "α=kβ".

In the above description, the processing for correcting, in step S403 shown in FIG. 4, the quantized pixel values by replacing them by the average pixel values calculated in step S402 has been explained. That is, each pixel value is replaced to guarantee that "corrected value of quantized pixel value=average pixel value". However, letting "k" be an arbitrary real number, a quantized pixel value may be replaced to guarantee that "corrected value of quantized pixel value=k× average pixel value".

Note that the method of calculating, in step S402, an average pixel value for each region having an equal quantized pixel value in step S300 is not limited to the aforementioned method. For example, a method of calculating an average pixel value may be changed according to the pixel value distribution shape (for example, when the pixel value distribution is broad, an arithmetic average method may be used; when the pixel value distribution is narrow, a weighted average method that gives importance to the center of the distribution may be used).

The present invention can also be realized by executing the following process. That is, a process whereby a software (program) that realizes the functions of the above-described embodiment(s) is supplied to the system or apparatus via a network or a recording medium of various types, and then a computer of the system or apparatus (or devices such as CPU or MPU) reads out the program and executes it. In such a case, the program and the recording medium where the program is stored are included in the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-241690, filed Sep. 19, 2008, which is hereby incorporated by reference herein in its entirety.

What is claimed is:

1. An image processing apparatus for quantizing an input image, comprising:

a first image generation unit configured to generate, from the input image, a reflectance image that represents a reflectance distribution, and an illuminance component image that represents an illuminance distribution;

a region specifying unit configured to specify a plurality of small regions divided based on illuminance components of the illuminance component image generated by the first image generation unit;

a second image generation unit configured to generate a quantized image from the reflectance image generated by the first image generation unit for respective small regions specified by the region specifying unit;

a region acquisition unit configured to acquire regions having equal quantized pixel values in the quantized image generated by the second image generation unit;

a pixel value acquisition unit configured to acquire representative pixel values for respective regions corresponding to the regions acquired by the region acquisition unit based on the illuminance component image generated by the first image generation unit; and a correction unit configured to correct quantized pixel values of the respective regions acquired by the region acquisition unit using the representative pixel values acquired by the pixel value acquisition unit.

2. The apparatus according to claim 1, wherein the second image generation unit further comprises a threshold generation unit configured to generate quantization thresholds for the respective small regions specified by the region specifying unit,
wherein the second image generation unit generates the quantized image from the reflectance image for the respective small regions specified by the region specifying unit based on the quantization thresholds generated by the threshold generation unit.

3. The apparatus according to claim 1, wherein the region specifying unit specifies the small regions by approximating a distribution of the illuminance components of the illuminance component image by a Gaussian mixture distribution, and dividing the illuminance component image, the distribution of the illuminance components of which is approximated, according to predetermined illuminance thresholds.

4. The apparatus according to claim 1, wherein the pixel value acquisition unit further comprises a third image generation unit configured to generate an illuminance component corrected image, in which the illuminance components are corrected, from the input image and the illuminance component image generated by the first image generation unit.

5. The apparatus according to claim 4, wherein the pixel value acquisition unit acquires the representative pixel values by calculating averages of pixel values for respective regions corresponding to the regions having the equal quantized pixel values acquired by the region acquisition unit in the illuminance component corrected image generated by the third image generation unit.

6. The apparatus according to claim 1, wherein the correction unit corrects the quantized pixel values of the respective regions acquired by the region acquisition unit by replacing the quantized pixel values by the representative pixel values acquired by the pixel value acquisition unit.

7. An image processing method executed by an image processing apparatus for quantizing an input image, the method comprising:
a first image generation step of generating, from the input image, a reflectance image that represents a reflectance distribution, and an illuminance component image that represents an illuminance distribution;
a region specifying step of specifying a plurality of small regions divided based on illuminance components of the illuminance component image generated in the first image generation step;
a second image generation step of generating a quantized image from the reflectance image generated in the first image generation step for respective small regions specified in the region specifying step;
a region acquisition step of acquiring regions having equal quantized pixel values in the quantized image generated in the second image generation step;
a pixel value acquisition step of acquiring representative pixel values for respective regions corresponding to the regions acquired in the region acquisition step based on the illuminance component image generated in the first image generation step; and
a correction step of correcting quantized pixel values of the respective regions acquired in the region acquisition step using the representative pixel values acquired in the pixel value acquisition step.

8. A non-transitory computer-readable medium storing an image processing program for quantizing an input image, the program making a computer function to:
generate, from the input image, a reflectance image that represents a reflectance distribution, and an illuminance component image that represents an illuminance distribution;
specify a plurality of small regions divided based on illuminance components of the generated illuminance component image;
generate a quantized image from the generated reflectance image for respective specified small regions;
acquire regions having equal quantized pixel values in the generated quantized image;
acquire representative pixel values for respective acquired regions based on the generated illuminance component image; and
correct quantized pixel values of the respective acquired regions using the acquired representative pixel values.

* * * * *